Figure 1:
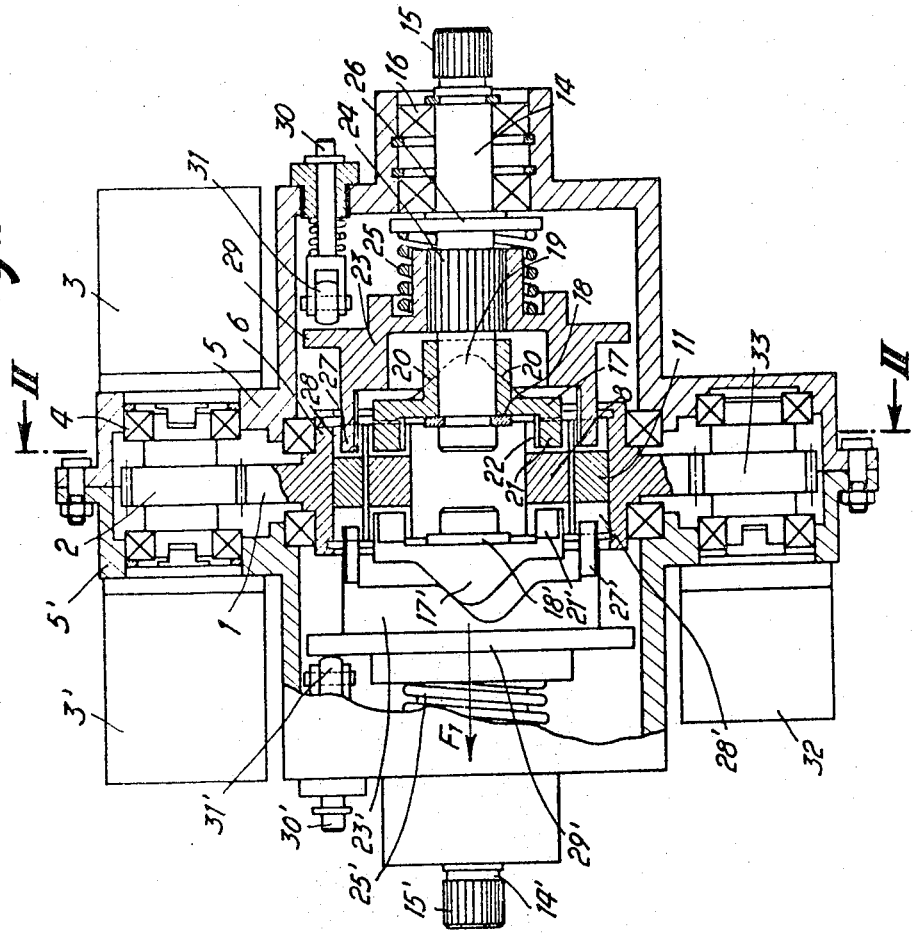

United States Patent
Bouhot

[15] 3,667,575
[45] June 6, 1972

[54] DOUBLE ACTING FREE WHEEL

[72] Inventor: Marcel Pierre Alexis Bouhot, 35 Avenue du General Sarrail, Paris, France

[22] Filed: Sept. 12, 1969

[21] Appl. No.: 870,726

Related U.S. Application Data

[62] Division of Ser. No. 719,922, Apr. 9, 1968, Pat. No. 3,499,511.

[30] Foreign Application Priority Data

Apr. 19, 1967 France.....................................103325
Nov. 21, 1967 France.....................................129035

[52] U.S. Cl.................................................188/134, 192/7
[51] Int. Cl.............................................................B60z 7/12
[58] Field of Search..................188/134, 82.2, 82.84; 192/7, 192/8

[56] References Cited

UNITED STATES PATENTS

3,367,456  2/1968  Bohnhoff...............................192/7 X

Primary Examiner—George E. A. Halvosa
Attorney—Paul H. Smolka

[57] ABSTRACT

The invention relates to stopping device for disconnecting two shafts, which comprises input drive means, an output driven shaft, displaceable wedging cam means releasably coupling said input drive means to said output driven shaft, means to displace said wedging cam means thereby to release said input drive means and said output driven shaft, means sensitive to the torque resisting rotation of said output driven shaft, said torque sensitive means being associated with said displacing means whereby when the resistance to torque reaches a predetermined value said displacing means is actuated to displace said wedging cam means.

1 Claim, 5 Drawing Figures

DOUBLE ACTING FREE WHEEL

This is a division of application Ser. No. 719,922 filed Apr. 9, 1968, now U.S. Pat. No. 3,499,511.

The present invention relates to a device for stopping a movement from a torque meter and is intended in particular for instantaneously disconnecting two operating shafts subjected to a driving torque when the resisting torque of one of the shafts exceeds a predetermined value. The invention also facilitates the instantaneous locking of a transmission shaft driving a rotating member as soon as the torque required by said member exceeds a determined value.

The invention may advantageously be used in aeronautics, for controlling high lift flaps which are operated by a series of mechanical actuators connected together by rotatably acting connecting rods capable of transmitting, with a certain margin, the total of the torques required by each actuator. In known arrangements, if one of the actuators offers an abnormal resisting torque, the total of the driving torque transmitted by the connecting rods tends to be applied to said actuator. If the mountings of the actuator have not been made excessively strong, considerable damage may result. In order to avoid such damage it is necessary to reinforce and consequently to increase the weight of certain parts of the structure. Moreover, it is necessary for every actuator to be capable of withstanding the entire driving torque without breaking. This results in increasing the size of all the actuators, or at least of some of their components, once again resulting in increased weight.

According to a first embodiment of the invention, the rotational movement is transmitted to each of the operating shafts by means of a drive of the "autolock" type in which, by a wedging effect and with the aid of rollers permanently subjected to the action of springs, a circular bowl drives a central cam which in turn, through a slot and screwdriver arrangement, for example, operates annular parts centered on each of the operating shafts at their ends and free to rotate but longitudinally held by stops, said parts being in addition provided with preferably symmetrically inclined slopes which through reaction tend to push back the drivers, which are provided with opposite slopes integral on rotation through sliding grooves or any other suitable means, with each of the operating shafts, against the action of springs which are of suitable size to ensure that the relative displacement of the annular parts and of the drivers is started and then contained only when the resisting torque at the output of one of the shafts attains and exceeds a predetermined value, this relative displacement which, because of the inclination of the slopes results in an angular dephasing of the annular parts and of the sliding drivers, has the effect of braking or stopping the rotation of the disconnection ring of the "autolock" system because of the teeth with which the sliding drivers are provided, and, through consequently unlocking the rollers which were driving the central cam, of effecting the instantaneous and simultaneous disconnection of the operating shafts.

According to a second embodiment of the invention, the driver, which is provided with inclined slopes, integral in rotation through sliding with the drive shaft, and which by means of a calibrated, initially compressed spring acts as torque measurer, drives on the one hand, with slight angular play, the central cam of the autolock (said central cam being centered on the drive shaft and provided with slopes opposite to those of the drive and directly or indirectly operating the element to be driven) and on the other hand, with the aid of sliding grooves, the disconnection ring of the autolock system, so that, said disconnection ring being rotationally operated from the commencement of the movement, the central cam of the autolock is unlocked before the male slopes of the driver come to bear against the female slopes of said cam due to the aforesaid angular play, and the said central cam is then driven as long as the resisting torque remains normal or else is instantaneously locked through the combined action of the rollers and of the fixed bowl of the autolock if said torque exceeds a certain predetermined value because the driver, being subjected to a thrust greater than that applied by the calibrated, initially compressed spring, withdraws under the effect of the reaction of the slopes, thereby compressing said spring slightly more, and frees the disconnection ring of the autolock system by reciprocal disengagement of the sliding grooves.

By using a screw and nut arrangement to fit the first embodiment of the invention to the mechanical actuators controlling high lift flaps in aircraft, the disconnecting action of the system intervenes when the resisting torque on a single shaft attains or exceeds the torque for which the springs have been calibrated. By similarly using a screw and nut arrangement to fit the second embodiment of the invention on the actuators controlling high lift flaps in aircraft, the locking of the linkage is effected when the force applied to an actuator exceeds a predetermined value corresponding to the force applied by the spring, which is calibrated for that purpose, to the driving device.

Figure 2:
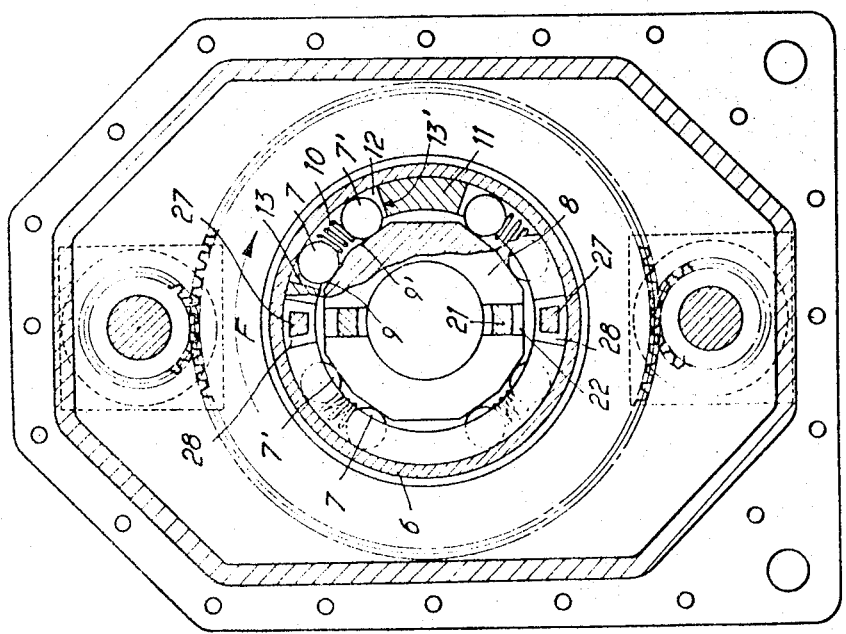
Figure 3:
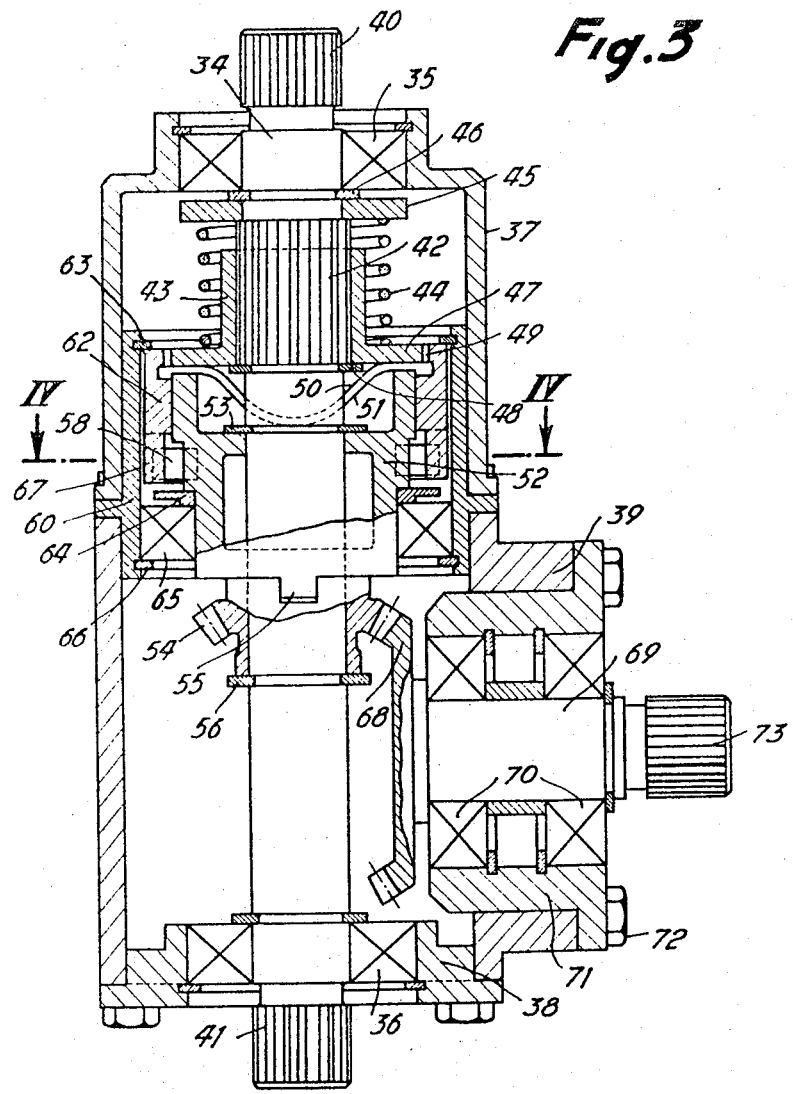
Figure 4:
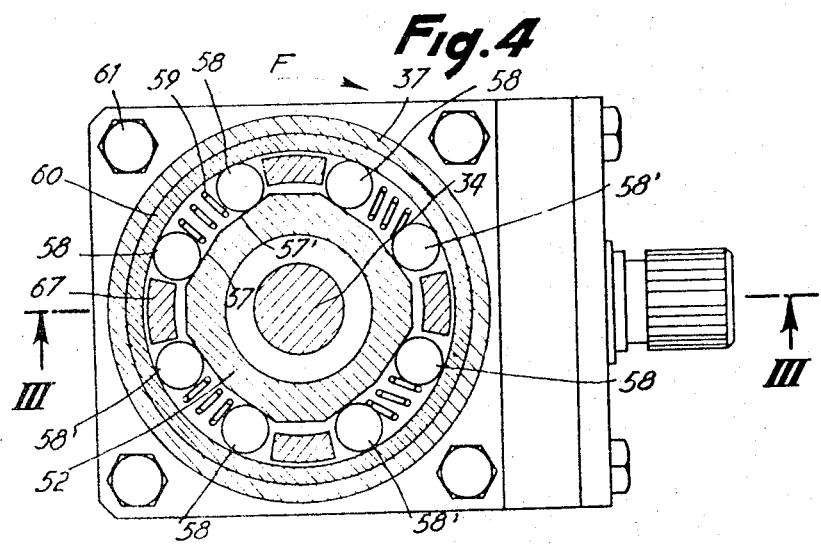
Figure 5:
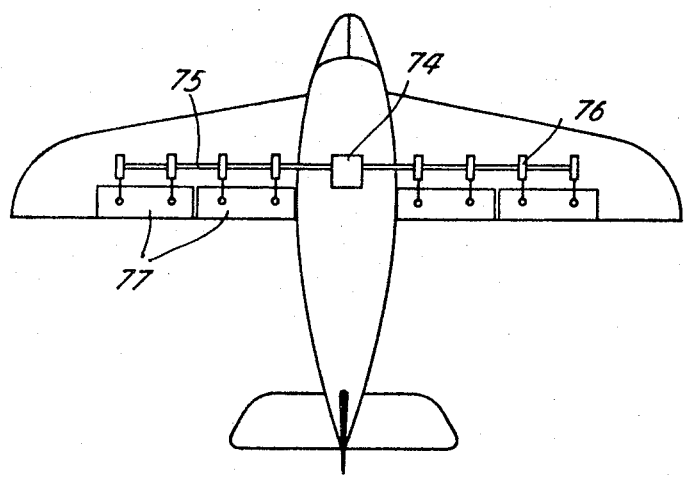

The invention is now described, by way of example, with reference to the accompanying drawings, in which:

FIG. 1 is a view in longitudinal section of a torque limiting device for two operating shafts, FIG. 2 is a view in rebatted section showing the arrangement of an automatic locking device in FIG. 1, FIG. 3 is a view in section of an alternative embodiment of the invention, showing another arrangement of the torque meter and roller drive system, FIG. 4 is a view in rebatted section along the line IV — IV in FIG. 3, and FIG. 5 diagrammatically illustrates an example of the present invention applied to devices controlling high lift flaps in aircraft.

The embodiment illustrated in FIGS. 1 and 2 is described in detail and particularly claimed in the parent case hereof which has issued as U.S. Pat. No. 3,499,511 and to which reference may be had as may be necessary or desired.

In the embodiment illustrated in FIGS. 3 and 4, the torque meter and roller drive system works by wedging, in such a manner as to make it possible to effect the instantaneous locking of a transmission shaft rotatably driving a member, as soon as the torque called for by the said member exceeds a determined value.

In the embodiment illustrated in FIG. 3, a drive shaft 34 is rotatably mounted in a casing 39 by means of bearings 35 and 36 and bearing blocks 37 and 38. This shaft is provided, at its ends with grooves 40 and 41 by which it receives or can transmit a movement of rotation, and with grooves 42 on which the driver 43 is adapted to slide. A calibrated, initially compressed spring 44, bearing on the one hand against a thrust washer 45 held axially by a stop segment 46 secured to the shaft 34, and on the other hand against a base 47 with which the driver 43 is provided, pushes the latter back against the stop segment 48. The base of the driver 43 is provided, with diametrically opposite teeth 50 the flanks of which are cut symmetrically in the form of helicoidal inclines, for example at an angle of 45°. Through their design these teeth 50 are inserted, with an angular play of a frew degrees, in inversely profiled hollows 51 provided in a central cam 52 of the autolock. This cam 52, which is centered on and free to rotate in relation to the drive shaft 34, is secured against axial movement in one direction by a stop segment 53 fastened to said shaft 34. Axial movement of the cam 52 in the other direction along the shaft 34 is prevented by stop segment 56, a bead pinion 54 being interposed between the cam and the segment. Teeth 55 (only one shown) of the cam 52 engage in recesses in the end face of the pinion.

As can be seen in FIG. 4, which is a rebatted sectional view along the line IV — IV in FIG. 3, the central autolock cam 52 is provided with suitably sloping, wedging inclines 57 and 57' which, in conjunction with the rollers 58 and 58' continuously subjected to the action of the compression springs 59, normally lock the central cam 52 in respect of rotation, in known manner, in relation to the bowl 60 which is rigidly fixed by the screws 61 on the casing 39.

The autolock system is completed by the disconnection ring 62 which is externally concentric to the central cam 52 and the base of 47 of the driver 43, and is bounded in the axial direction by the stop segment 63 fastened to the bowl 60 and by the stop 64 held captive between a shoulder of the cam 52 and the bearing 65 which, abutting against the stop segment 66, centers said cam in the bowl 60. The disconnection ring 62 is provided with fingers 67 which are normally received (see FIG. 4) with slight play, which is less than the angular play of the inclined surfaces 50 and 51, between the different pairs of rollers 58 and 58'. Mating grooves 49 are formed in the base 47 of the driver 43 and in the disconnection ring 62, so that the driver 43 can impart rotational movement to said ring.

In the present example the bevel pinion 54 meshes with bevel gear 68 fastened to shaft 69, which is centered by the bearing 70 in the bearing block 71 fixed on the casing 39 by the screws 72. The shaft 69, which is provided with grooves 73, rotatably drives by any known means an element (not illustrated) which in normal operation requires a torque of fixed or variable value within a predetermined limit.

When the shaft 34 is rotated in the direction of the arrow F, for example, the driver 43, which is keyed for rotation with said shaft 34 by the grooves 42, instantaneously transmits this rotational movement through the mating grooves 49 to the disconnection ring 62. The fingers 67 of the ring 62 push back the rollers 58 and free them from the wedging inclines 57. When rotation is in the direction of arrow F, there is no tendency for the rollers 58' to wedge against surfaces 57'. Thus the central cam 52 is free to rotate. Consequently, as soon as the male inclined surfaces 50 of the driver 43, which were angularly at a distance from the female inclines 51 formed in the central cam 52 by a value greater than the angular play existing through their design between the fingers 67 of the disconnection ring 62 and the rollers 58 and 58', come to bear against the female inclined surfaces 51 of the central cam 52, the cam is rotated. By engagement of the teeth 55 with the bevel pinion 54, said pinion is rotated and a drive is imparted through the bevel gear 68 to shaft 69. The shaft 69 is supported in bearings 70 in an output drive shaft, an element to be driven being coupled to the free end 73 of the shaft 69.

Since the torque to be supplied by the driver 43 is directly dependent on the torque absorbed by the driven element, subject to efficiency and reduction ratio, if this absorbed torque varies the pressure applied by the inclined surfaces 50 on the inclined surfaces 51 likewise varies. Because of the inclination of these surfaces this pressure results in an axial reaction which tends to push the driver 43 back towards the thrust washer 45. If the value of this axial reaction is lower than the force applied by the calibrated, initially compressed spring 44, the driver 43 remains against the stop segment 46. If, on the other hand, the torque absorbed by the element increases either slowly or abruptly, but in such a manner that the axial reaction on the driver 43 becomes greater than the force normally applied by the spring 11, the driver 43 is pushed towards the stop 45 and out of engagement with the disconnection ring 62. As soon as this occurs the ring 62 is free to rotate on its own and no longer applies any bias to the rollers 58 to keep them from wedging against the surfaces 57. The rollers 58, subjected to the action of the springs 59, turn the ring 62 slightly in the opposite direction to the direction F and, by wedging against the surfaces 57 and the bowl 60 lock the central cam 52 against rotation. As the bowl 60 is rigidly fixed on the casing 39, the torque to be supplied by the driver 43 to the central cam 52 which has just been locked, increases abruptly. The driver 43 is pushed back completely, that is to say until the opposite end to that where the base 47 is situated strikes against the thrust washer 45. Since the central cam 52 is on the one hand locked in the bowl 60 and on the other hand is held in the axial direction by the pinion 54 and the stop segment 56 and since the male and female teeth provided on the helicoidal inclined surfaces 50 and 51 are of such size as to ensure that they are not disconnected when the driver 43 strikes against the washer 45, the shaft 34 is abruptly stopped.

If after this locking the shaft 34 is rotated in the opposite direction to arrow F, the driver 43 being pushed back by the spring, the male teeth 50 of said driver re-engage the female slopes 51 of the central cam 52, and the mating grooves 49 in the base 47 and the disconnection ring 62, also re-engage. The ring, being thereby secured to the driver 43, releases the central cam 52. Once the angular play provided between the teeth 51 and inclined surfaces 51 has been absorbed, the driver 43 effects rotation of the central cam 52, of the pinion 54, the bevel gear 68, and the shaft 69.

If the shaft 34 is stopped, the shaft 69 likewise stops. In addition, if after this stoppage the element (not illustrated), to which the shaft 69 is connected, tends to drive said shaft 69 in one direction or the other, the movement will be immediately blocked because the central cam 52 will itself be locked by the action of the rollers 58 or 58' in the circular bowl 60.

The device as described in connection with FIGS. 1 and 2 makes it possible to solve problems of the type arising in aeronautics for the control of high lift flaps.

As illustrated in FIG. 5, which shows diagrammatically an application to aircraft, a drive unit 74, generally disposed in the axis of the aircraft and operated hydraulically in most cases by two motors fed from two different hydraulic generators, rotatably drives the linkage elements 75. The latter connect together a number of mechanical actuators 76 of the linear type.

The actuators, of which there are generally two per flap, synchronously operate the high lift flaps 77 which are lowered on take-off and landing in order to increase lift and are withdrawn or retracted during the remainder of the flight. The movement of the flaps corresponds to the kinematics which are sometimes complicated because of the movement of rollers, which are fastened to the flaps by their shaft, in curvilinear rails. For this purpose the actuators are provided at their movable end with a clevis articulated on the flaps, the rails being fastened to fixed parts of the wing.

It will be understood that if a roller is wedged in the rail, the corresponding actuator tends to be locked and to apply to said roller all the force available in the linkage. In order to avoid damage, it would therefore be necessary that every actuator and every aircraft structure around said actuator should be capable of withstanding all the available force, which is normally distributed over all the actuators. This results in excessive reinforcement and additional weight.

The present invention has the aim of limiting the abnormal forces when they occur, after having previously detected them.

It should be noted that it is possible to increase the size of the linkage with a practically non-prohibitive increase in weight so that it is capable of withstanding a torque considerably greater than the maximum torque which may be produced by the drive unit. The torque of this drive unit is determined on the following basis: it is necessary that it should be capable of developing, when driven by only one motor, a torque at least equal to that which is necessary for operation of the flaps, in the proximity of maximum operating forces.

In the case of FIG. 5 assuming (which is not always the case) that the forces are identical for all the actuators (of which there are here eight), if one of the actuators is locked as the result of an incident this actuator may receive a force greater than 2 × 8 (number of actuators), that is to say greater than 16 times the normal force to be supplied by each of the actuators, when both hydraulic drive motors are working.

The device as illustrated in FIGS. 3 and 4 is particularly suitable for cargo aircraft of the "VFW 614" type. In this case each of the eight actuators must supply an identical force, utilizing a torque $C_2$ which is supplied to it by the linkage. The latter must therefore supply a total of at least $8 \times C_2$, or with a safety margin 10 to 12 $C_2$. Likewise adopting a safety margin in the design of each actuator and its fastening to the structure, in case of an incident, each actuator should be able to withstand about 16 $C_2$.

If in accordance with the embodiment illustrated in FIGS. 3 and 4 the linkage were locked, and if a very large safety margin were provided, that is to say $2 \times C_2$ per actuator corresponding to the operation of the torque meter, the linkage would be locked for this value $2 \times C_2$. If each actuator were designed for $3 C_2$, there would be a saving in weight as compared with the first solution, which requires about $8 C_2$. The locking device which must be incorporated in each actuator requires a little additional weight, but far less than the reinforcement required for an increase from $3 C_2$ to $8 C_2$. This solution however would not have been valid for the "Jaguar" type, because owing to its relative dimensions it would not have been possible to accommodate the locking device on each actuator.

By fitting this device to each actuator, the force to which each of them may be accidentally subjected is limited to a reasonable predetermined value, which is for example 30 to 50 percent higher than the force which is has to develop under normal operating conditions. When the force on one of the actuators exceeds this value, the entire linkage is instantaneously locked and the installation, although calculated to a minimum, is protected against any damage.

What is claimed is:

1. A mechanical torque limiter comprising an input drive shaft, a driver keyed to said drive shaft and axially displaceable therealong, a cam block mounted on and relatively rotatable about said input drive shaft, said driver and said cam block being provided respectively with male and female abutment surfaces inclined with respect to the axis of said shaft and curved therearound, spring means biasing said driver against axial displacement away from said cam block, an output drive shaft, gearing coupling said output drive shaft to said cam block, a fixed annular bowl surrounding, in spaced relation, said cam block, at least one pair of wedging rollers mounted between said cam block and said bowl and adapted to bear against the inner surface of said bowl and inclined surfaces at the periphery of said cam block, means biasing the said rollers apart circumferentially with respect to said cam block, and a disconnecting ring concentrically disposed around said cam block within the bowl and loosely mounting said rollers, said ring being rotatable relative to said cam block and being releasably engaged with said driver for rotation therewith, engagement of said ring with said driver being released upon axial displacement of said driver away from said cam block.

* * * * *